United States Patent [19]

Hoppough

[11] 4,028,507

[45] June 7, 1977

[54] APPARATUS FOR APPLYING PARTICULAR VOLTAGES TO THREE-TERMINAL CIRCUITS AND MEASURING RESULTING CURRENT FLOWS FOR THE PURPOSE OF DETERMINING CIRCUIT CHARACTERISTICS

[75] Inventor: Richard Scott Hoppough, Greensboro, N.C.

[73] Assignee: Bell Telephone Laboratories, Incorporated, Murray Hill, N.J.

[22] Filed: June 28, 1976

[21] Appl. No.: 700,333

[52] U.S. Cl. .......................... 179/175.3 R; 324/62
[51] Int. Cl.² ...................................... H04B 3/46
[58] Field of Search ............... 179/175.3 R, 175; 324/62 R, 51

[56] References Cited

UNITED STATES PATENTS

| 2,677,102 | 4/1954 | Young | 324/62 R |
| 3,411,081 | 11/1968 | Schulz | 324/62 R |
| 3,582,774 | 6/1971 | Forgacs | 324/62 R |

Primary Examiner—Douglas W. Olms
Attorney, Agent, or Firm—H. L. Logan

[57] ABSTRACT

Apparatus which may be used in the performance of at least six tests on a telephone subscriber's line is disclosed. The apparatus operates to force the tip and ring leads of a line to particular potential levels and then produces output voltages related to the currents flowing in the tip and ring leads. These output voltages may be processed to perform the following test: dc Thevenin, ac three-terminal admittance, ac foreign emf, percent imbalance, swept loaded loop and detection of unauthorized equipment. The apparatus may be used when performing tests on other three-terminal circuits.

2 Claims, 3 Drawing Figures

FIG. 3

| TEST | STEP | $V_R$ MAGNITUDE DC OR RMS | $V_R$ FREQUENCY (Hz) | $V_T$ MAGNITUDE DC OR RMS | $V_T$ FREQUENCY (Hz) | EXTRACT FROM $V_{14}$ AND $V_{17}$ | CALCULATE FROM EXTRACTED VALUES |
|---|---|---|---|---|---|---|---|
| DC THEVENIN | 1 | 0 | | 0 | | DC | $Y_{TG} = \dfrac{V_{14}^{(2)} - V_{14}^{(1)}}{ER_{24}}$    $E_{TG} = -\dfrac{V_{14}^{(1)}}{Y_{TG}R_{24}}$ |
| | 2 | E | DC | E | DC | DC | $Y_{RG} = \dfrac{V_{17}^{(2)} - V_{17}^{(1)}}{ER_{24}}$    AND    $E_{RG} = -\dfrac{V_{17}^{(1)}}{Y_{RG}R_{24}}$ |
| | 3 | E | DC | 0 | | DC | $Y_{TR} = \dfrac{V_{14}^{(3)} - V_{14}^{(1)}}{ER_{24}}$    FOR $E_{TR} = 0$; * |
| AC 3 TERMINAL ADMITTANCE | 1 | E | $f^{}$ | E | $f^{}$ | $f^{**}$ | $Y_{TG} = \dfrac{V_{14}^{(1)}}{ER_{24}}$ |
| | | | | | | | $Y_{RG} = \dfrac{V_{17}^{(1)}}{ER_{24}}$ |
| | 2 | E | $f^{}$ | 0 | | $f^{}$ | $Y_{TR} = \dfrac{V_{17}^{(2)}}{ER_{24}}$ |
| AC FOREIGN EMF | 1 | 0 | | 0 | | AC | $|V_1|, |V_2|, |V_1 - V_2|, |V_1 + V_2|$ |
| % IMBALANCE | 1 | E | $f^{}$ | E | $f^{}$ | $f^{**}$ | $\% = \dfrac{|V_{14} - V_{17}|}{|V_{14} + V_{17}|} \times 2 \times 100$ |
| DETECTION OF UNAUTHORIZED EQUIPMENT | 1 | E | $f_1, f_2$ | E | $f_1, f_2$ | $f_1, f_2$ | $|V_{14}|^{f_1} - |V_{14}|^{f_2}$ |
| | 2 | E | $f_1, f_2$ | 0 | | $f_1, f_2$ | $|V_{17}|^{f_1} - |V_{17}|^{f_2}$ |
| SWEPT LOADED LOOP | 1 | E | SWEEP $f_x$ TO $f_y$ | $E/180°$ | | $f_x$ TO $f_y$ | FOR $Y_T = Y_{TR} + \dfrac{Y_{TG} Y_{RG}}{Y_{TG} + Y_{RG}}$, $|Y_T| = \dfrac{|V_{14}| - |V_{17}|}{4R_{24}|E|}$ |

*PLUS TWO MORE PAIRS FOR $E_{TG}$ AND $E_{RG} = 0$    **AT THE FREQUENCY OF INTEREST

APPARATUS FOR APPLYING PARTICULAR VOLTAGES TO THREE-TERMINAL CIRCUITS AND MEASURING RESULTING CURRENT FLOWS FOR THE PURPOSE OF DETERMINING CIRCUIT CHARACTERISTICS

BACKGROUND OF THE INVENTION

1. Field of the Invention

This invention relates to performing a plurality of tests on three-terminal circuits.

2. Description of the Prior Art

It is frequently necessary to measure some characteristics of three-terminal circuits. For example, telephone companies are constantly performing tests on telephone subscribers' lines, which comprise three-terminal circuits, to determine the causes of trouble reports. Heretofore, various of these tests were performed on an individual basis in the sense that separate equipments were used. This approach is both time consuming and requires numerous pieces of test equipment. Furthermore, the results produced often lacked the accuracy desired.

SUMMARY OF THE INVENTION

An object of the present invention is to reduce both the time and equipment required for such testing and, furthermore, to improve the accuracy of the results produced.

This and other objects are achieved by forcing two terminals of a three-terminal network, or circuit, to particular voltages with respect to the third terminal and then producing output voltages relating to the currents flowing in the two terminals. These output voltages may be used to calculate various admittances and voltages associated with the line under test.

Apparatus, in accordance with the invention, includes first and second identical circuits. Each circuit responds to an input driving voltage to force a terminal, with respect to ground, to this driving voltage. Each of these circuits further responds to current flowing through its terminal to produce an output voltage related to this current. In one embodiment, each circuit comprises a pair of operational amplifiers with negative feedback paths. A first of these amplifiers has an inverting input which tracks in potential a driving voltage applied to a noninverting input. This amplifier produces an output voltage containing both a driving voltage component and an inverting input current component. The other operational amplifier receives the first amplifier output voltage and cancels the driving voltage component so as to produce an output containing only the current component. This apparatus also includes a source for producing the driving voltages. As will become apparent in the following discussion, these voltages may be dc or ac and of equal or unequal amplitude.

BRIEF DESCRIPTION OF THE DRAWING

In the drawings:

FIG. 3 shows a table which summarizes various ways in which embodiments of the invention may be used.

DETAILED DESCRIPTION OF APPARATUS EMBODYING THE INVENTION

Figure 1:
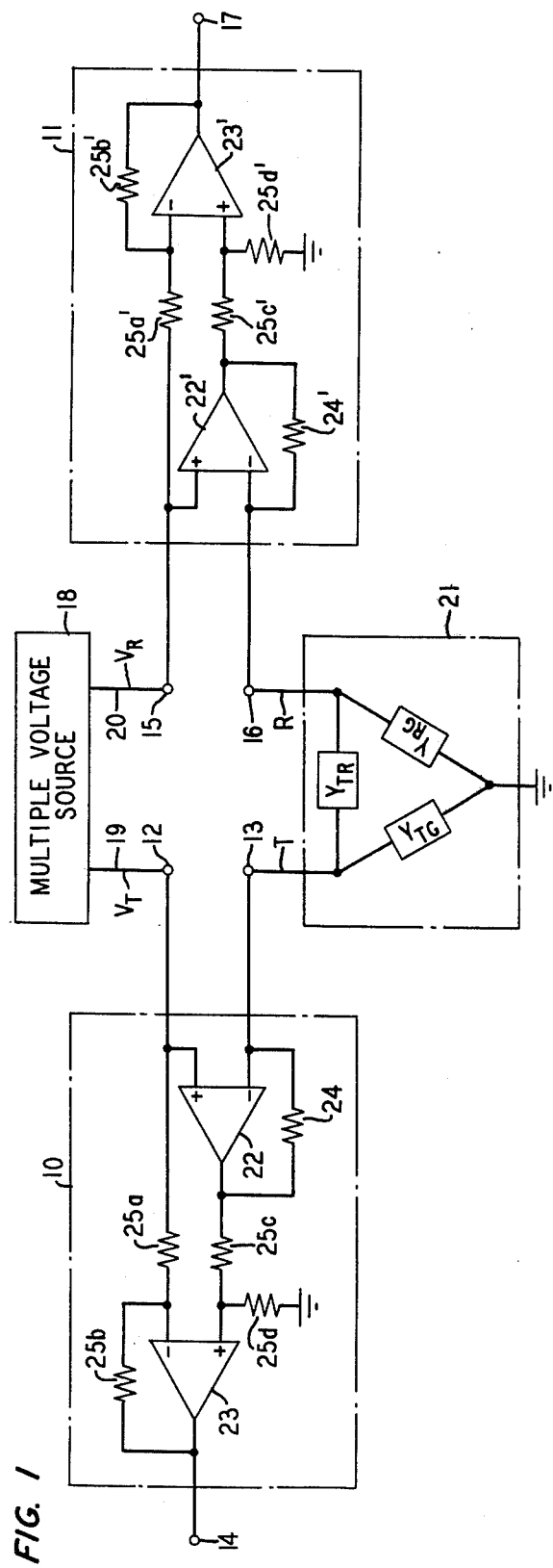
FIG. 1 shows apparatus embodying the invention.

An embodiment of the invention is disclosed in FIG. 1. This embodiment comprises identical circuits 10 and 11 where circuit 10 has a pair of input terminals 12 and 13 and an output terminal 14 while circuit 11 has similar input terminals 15 and 16 and a similar output terminal 17. Circuit 10 operates in a manner (which is described in detail hereinafter) whereby the potential level on terminal 13 is forced to substantially the potential level of a voltage applied to terminal 12. Circuit 10 further operates to produce a voltage on output terminal 14, which voltage is linearly related to the current flow through input terminal 13 (this is likewise discussed in detail hereinafter). Circuit 11 operates in the same manner with respect to its input and output terminals.

The embodiment of FIG. 1 further includes a multiple voltage source 18 which produces two output voltages on leads 19 and 20, respectively. Leads 19 and 20 are connected to input terminals 12 and 15 of circuits 10 and 11, respectively. As is discussed in detail hereinafter, each output with respect to ground of source 18 can produce a direct, single-frequency or multiple-frequency voltage or a zero level voltage. Furthermore, in the case of ac voltages, the two outputs may be in phase or out of phase with respect to one another.

The embodiment is shown and described as connected to the tip and ring leads of a telephone subscriber's line as represented by a three-terminal network in a block 21. Block 21 contains a typical admittance representation of such structure.

The structure and operation of circuits 10 and 11 are now considered in detail.

Circuit 10 comprises two operational amplifiers 22 and 23 each having inverting and noninverting inputs and an output. The noninverting and inverting inputs of amplifier 22 are directly connected to terminals 12 and 13, respectively, while a feedback resistor 24 is connected between the output and inverting input of the amplifier. With respect to amplifier 23, its inverting input is connected via a resistor 25a to terminal 12 and via a feedback resistor 25b to its output. Furthermore, the noninverting input of amplifier 23 is connected to the output of amplifier 22 via a resistor 25c and to ground via a resistor 25d. Resistors 25a, 25b, 25c and 25d are all the same value.

Circuit 11 has the same components interconnected in the same manner. For convenience, the components of circuit 11 have been identified with the same symbols used in circuit 10 but with prime notations added.

The relationships of the voltages on terminals 14 and 17 as a function of the voltage outputs of source 18 and currents into and out of the tip and ring leads are derived below. Substitutions are then made in these relationships to show how the voltages on terminals 14 and 17 are related to the voltage outputs of source 18 and the admittance values of the legs in the delta representation of the telephone line in block 21.

Before deriving the relationships, the following comments, which directly bear on the derivations, are offered.

There are two principle characteristics of operational amplifiers, namely extremely high input impedances and extremely high gains. (In many engineering uses, the input impedances and the gains are assumed to be infinite.) The extremely high input impedances result in negligible currents flowing into or out of the amplifier inputs. The extremely high gains coupled with negative feedback result in both inputs to a given amplifier being substantially at the same potential level. These two results are applied in deriving the following equations without any further reference thereto.

In the following:

$V_T$ and $V_R$ = voltages applied by source 18 terminals 12 and 15, respectively;
$V_{o-22}$ = output of amplifier 22;
$I_{TR}$ = current from tip lead through $Y_{TR}$ to ring lead;
$I_{TG}$ = current from tip lead through $Y_{TG}$ to ground;
$I_{RG}$ = current from ring lead through $Y_{RG}$ to ground; and
$V_{i-23}$ = inputs to amplifier 23;

The output of amplifier 22 is $$V_{o-22} = V_T + (I_{TR} + I_{TG})R_{24}. \quad (1)$$

Because resistors 25c and 25d are equal, the inputs to amplifier 23 are $$V_{i-23} = \frac{V_{o-22}}{2} = \frac{V_T + (I_{TR} + I_{TG})R_{24}}{2}. \quad (2)$$

The voltage across resistor 25a is $$V_{25a} = V_T - V_{i-23}$$
$$= \frac{V_T - (I_{TR} + I_{TG})R_{24}}{2}. \quad (3)$$

Because resistors 25a and 25b are equal, the voltage across resistor 25b is $$V_{25b} = V_{25a} = \frac{V_T - (I_{TR} + I_{TG})R_{24}}{2}. \quad (4)$$

The output of amplifier 23 is $$V_{14} = V_{i-23} - V_{25b}$$
$$= (I_{TR} + I_{TG})R_{24}. \quad (5)$$

In a similar manner, $$V_{17} = (I_{RT} + I_{RG})R_{14}. \quad (6)$$

Equation (5) expresses the relationship between the voltage at terminal 14 and the total current associated with the tip lead. Similarly, equation (6) expresses the relationship between the voltage at terminal 17 and the total current associated with the ring lead.

From equations (5) and (6), it is apparent that each of circuits 10 and 11 produces a voltage linearly related to the current at one of its inputs.

In the above discussion, resistors 25a, 25b, 25c and 25d were stated as being of the same value. In practice, this is not a necessary requirement; what is necessary is that equal portions of $V_T$ be applied to the inverting and noninverting inputs of amplifier 23 so that this component does not appear in $V_{14}$. It will be noted that the $V_T$ portions of equations (2) and (4) cancel when their difference is taken in equation (5) (i.e., through the difference action of amplifier 23).

The manner in which the voltages $V_{14}$ and $V_{17}$ are used to perform several tests on a subscriber's line is now discussed.

Figure 2:
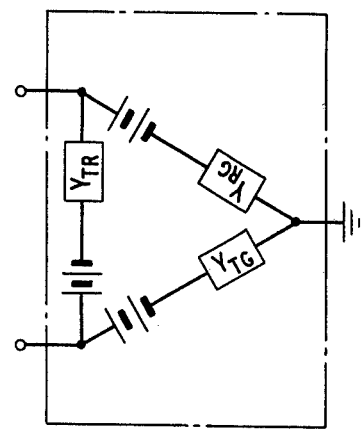
FIG. 2 shows a Thevenin equivalent circuit of a telephone subscriber's line.

The dc Thevenin equivalent circuit measurements are discussed first. Such a circuit with admittances and voltage sources associated with the line is shown in FIG. 2. These voltage sources may comprise central office battery or some foreign sources.

Although it is impossible to uniquely determine more than two equivalent source voltages, three are given in the figure. It will be shown that the three admittances can be determined without assuming either voltage source is zero. Using these resistances, it is then possible to calculate two equivalent voltage sources by assuming the remaining one is zero or some other known value.

The various tip and ring currents may be expressed as $$I_{TG} = (V_T - E_{TG}) Y_{TG}, \quad (7)$$
$$I_{RG} = (V_R - E_{RG}) Y_{RG} \text{ and} \quad (8)$$
$$I_{TR} = (V_T - V_R - E_{TR}) Y_{TR}. \quad (9)$$

When equations (7), (8) and (9) are substituted in equations (5) and (6) the following equations are produced.

$$V_{14} = [(V_T - V_R - E_{TR}) Y_{TR} + (V_T - E_{TG}) Y_{TG}]R_{24} \quad (10)$$
$$V_{17} = [(V_T - V_R - E_{TR}) Y_{TR} + (V_R - E_{RG}) Y_{RG}]R_{24}. \quad (11)$$

To determine the five Thevenin equivalent circuit parameters, perform three steps and measure five voltages as follows:

Step 1: Set $V_T = V_R = O$, measure $V_{14}^{(1)}$ and $V_{17}^{(1)}$
Step 2: Set $V_T = V_R = E$, measure $V_{14}^{(2)}$ and $V_{17}^{(2)}$
Step 3: Set $V_T = O$, $V_R = E$, measure $V_{14}^{(3)}$ (The notation $V_{14}^{(1)}$ means voltage $V_{14}$ measured under step 1 and so on.)

Evaluating equation (10) for steps 1 and 2, and subtracting gives $$V_{14}^{(2)} - V_{14}^{(1)} = ER_{24} Y_{TG}, \quad (12)$$

or $$Y_{TG} = \frac{V_{14}^{(2)} - V_{14}^{(1)}}{ER_{24}}. \quad (13)$$

Evaluating equation (11) for steps 1 and 2 and subtracting gives $$Y_{RG} = \frac{V_{17}^{(2)} - V_{17}^{(1)}}{ER_{24}}. \quad (14)$$

The tip-ring leakage is calculated using steps 1 and 3 in equation (10) and subtracting to give $$Y_{TR} = \frac{V_{14}^{(3)} - V_{14}^{(1)}}{ER_{24}}. \quad (15)$$

Equations (13), (14) and (15) give the three admittances in terms of the applied voltage E, the value of resistor 24, and the five measured voltages. Note that it was not necessary to assume $E_{TR} = O$.

A very important feature of the invention is apparent from the above admittance equations - namely, these admittances are independent of one another. As a consequence, high admittance (i.e. low impedance) shunting effects which heretofore have produced masking, are not present. For example, if $Y_{TG}$ and $Y_{RG}$ are high valued relative to $Y_{TR}$ and it is desired to determine $Y_{TR}$, prior art techniques would measure and compute the series combination of $Y_{TG}$ and $Y_{RG}$ in parallel with $Y_{TR}$. The resulting answer would be dominated by $Y_{TG}$ and $Y_{RG}$. With the present invention, $Y_{TR}$ is determined completely independent of $Y_{TG}$ and $Y_{RG}$ as long as one of these two admittances has a value which permits one of voltages $V_T$ and $V_R$ to be forced on terminals 13 and 16. If $Y_{TG}$, for example, had an infinite value — i.e. it is a short circuit — and $Y_{RG}$ has a less than infinite value, then $Y_{TR}$ can be determined by applying the teachings of FIG. 3. By connecting the ring lead and ground to terminals 13 and 16 and removing the ground lead of source 18 from ground and connecting it to the tip lead and repeating the steps for determining $Y_{TR}$, $V_{RG}$ can be determined.

Once the admittances are known, three different pairs of equivalent sources can be calculated by assuming $E_{TR}$, $E_{TG}$, and $E_{RG}$ to be zero one at a time. For $E_{TR} = O$, applying the condition of step 1 to equations (10) and (11) gives $$E_{TG} = -\frac{V_{14}^{(1)}}{Y_{TG}R_{24}} \text{ for } E_{TR} = O \quad (16)$$

and $$E_{RG} = -\frac{V_{17}^{(1)}}{Y_{RG}R_{24}} \text{ for } E_{TR} = O. \quad (17)$$

The other two pairs of voltages may be derived in a similar manner by assuming $E_{TG} = O$ and then $E_{RG} = O$. All of this is presented in a summarized form in FIG. 3.

The ac three-terminal admittance test is next considered. This test requires two steps. The first step applies a sinusoidal voltage $E$ as both $V_T$ and $V_R$. As the tip and ring voltages are equal, current does not flow through $Y_{TR}$ and therefore $$V_{14}^{(1)} = ER_{24}Y_{TG} \text{ and}$$

$$V_{17}^{(1)} = ER_{24'} \cdot Y_{RG} .$$

(These two voltages will no doubt require filtering to eliminate foreign frequency signals.) Admittance phase is obtained by phase comparing these voltages with $V_T^{(1)}$ and $V_R^{(1)}$, respectively, while admittance magnitude is obtained by precision rectifying and integrating. The dc values thus produced are proportional to the product of the admittance magnitude and the known quantities E and $R_{24}$ or $R_{24'}$.

In step 2, the same ac voltage E is applied as $V_R$ while $V_T = O$. Under these conditions, $Y_{TG}$ has zero volts across it (therefore no current flows through it) and $$V_{14} = ER_{24}Y_{TR} .$$

Admittance phase and magnitude information are obtained as in step 1.

This test is likewise summarized in FIG. 3.

The tests for ac foreign emf, percent imbalance, detection of unauthorized equipment and swept loaded loop are also presented in summarized forms in FIG. 3.

The various calculations set forth in FIG. 3 may be performed by an operator or by various apparatus such as hard-wired circuits or by a programmed computer. In many cases calculations are unnecessary. For example, the products of voltages $V_T$ and $V_R$ and resistors 24 and 24' are constants. With this in mind, conversion tables may be produced to directly convert output voltages $V_{14}$ and $V_{17}$ into admittances. On the other hand, these parameters may be selected so that the products are a multiple of ten, whereby output voltages are directly convertible to admittances by merely moving decimal points.

Although the invention has been discussed with respect to its use in testing telephone lines, it is to be understood that it may be used for testing other three-terminal circuits. As an example, it may be used to determine the value of a coupling capacitor in an amplifier without having to disconnect the capacitor. This is accomplished by disabling the amplifier power supply, connecting terminals 13 and 16 to either side of the capacitor and performing step two under the AC 3 Terminal Admittance test of FIG. 3, whereby $$Y = \frac{V_{17}^{(2)}}{ER_{24}} .$$

In this case the entire circuit is treated as a three-terminal circuit wherein the two terminals of the capacitor and ground comprise the three terminals. Other components may be similarly measured. Furthermore, as pointed out earlier herein, these measurements are independent of low impedance paths between the component terminals and ground.

What is claimed is:

1. Apparatus for forcing the terminals of a circuit to particular potential levels and for producing output voltages relating to currents flowing in said terminals, which output voltages may be utilized in determining the characteristics of said circuit, said apparatus comprising first and second means each having a first input terminal for receiving an input voltage, a second input terminal for connection to one of said circuit terminals and, furthermore, which is forced to substantially the same potential level as said input voltage, and an output terminal for producing an output voltage linearly related to current through said second input terminal, and third means operable for applying at least one combination of two voltages to said first input terminals, respectively, where said combination may comprise voltages of finite value, voltages of zero value or a voltage of finite value and a voltage of zero value.

2. Apparatus in accordance with claim 1 in which said first and second means comprise like structure, each of which comprises first and second operational amplifiers each having an inverting input, a noninverting input, an output and a feedback resistor connected between its inverting input and its output, fourth means connecting said first amplifier inverting input to a respective one of said first and second means first input terminals, fifth means connecting said first amplifier noninverting input to a respective one of said first and second means second input terminals, sixth means connecting said second amplifier inverting input to said respective one of said first input terminals to apply at least a portion of any voltage thereon to said second amplifier inverting input, seventh means connected between said second amplifier noninverting input and said first amplifier output to apply a like portion of the voltage thereon to said second amplifier noninverting input, and eighth means connected between said second amplifier output and a respective one of said first and second means output terminals.

* * * * *

UNITED STATES PATENT AND TRADEMARK OFFICE
CERTIFICATE OF CORRECTION

PATENT NO. : 4,028,507
DATED : June 7, 1977
INVENTOR(S) : Richard S. Hoppough

It is certified that error appears in the above-identified patent and that said Letters Patent are hereby corrected as shown below:

Column 3, line 45, the comma should be a prime associated with the number "14". Column 4, line 23, the comma should be a prime associated with the number "24". Column 5, line 37, the period immediately following "24'" should be deleted; line 46, the raised period after "24" should be a prime associated with the number "24".

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*